United States Patent [19]

Starmer

[11] 4,048,261

[45] Sept. 13, 1977

[54] VULCANIZABLE COMPOSITIONS OF A HALOGEN-CONTAINING POLYMER AND A DIENE-NITRILE RUBBER HAVING ACTIVE HALOGEN CURE SITES

[75] Inventor: Philip Hubert Starmer, Avon Lake, Ohio

[73] Assignee: The B. F. Goodrich Company, Akron, Ohio

[21] Appl. No.: 630,452

[22] Filed: Nov. 10, 1975

[51] Int. Cl.$^2$ .................. C08L 23/28; C08L 47/00
[52] U.S. Cl. .................................. 260/888; 260/889; 260/890; 260/894
[58] Field of Search ............... 260/888, 890, 894, 66, 260/79.5; 526/291, 293

[56] References Cited

U.S. PATENT DOCUMENTS

| | | | |
|---|---|---|---|
| 2,892,806 | 6/1959 | Moore | 260/890 |
| 2,933,117 | 4/1960 | Baldwin et al. | 260/890 |
| 3,063,961 | 11/1962 | Frank | 260/890 |
| 3,351,517 | 11/1967 | Willis | 260/890 |
| 3,763,119 | 10/1973 | De Marco et al. | 260/890 |
| 3,769,370 | 10/1973 | Martin et al. | 260/890 |
| 3,976,625 | 8/1976 | Starmer | 260/79.5 P |

*Primary Examiner*—J. Ziegler
*Attorney, Agent, or Firm*—Alan A. Csontos

[57] ABSTRACT

Compositions comprised of a polymer blend of a halogen-containing polymer and a diene/nitrile rubber having active halogen cure sites are covulcanized using a common cure system. The halogen-containing polymers used in the polymer blend include the commercial polymers such as epihalohydrin polymers, polychloroprenes, fluoroelastomers, halogen-containing acrylates, and halogenated polyolefins. The curative ingredients employed are those normally used for the cure of the halogen-containing polymer employed in the polymer blend.

11 Claims, No Drawings

VULCANIZABLE COMPOSITIONS OF A HALOGEN-CONTAINING POLYMER AND A DIENE-NITRILE RUBBER HAVING ACTIVE HALOGEN CURE SITES

BACKGROUND OF THE INVENTION

Diene/nitrile rubbers, commonly called nitrile rubbers or NBR rubbers, are well known. The polymers are cured using sulfur or peroxide cure systems to yield vulcanizates having excellent original physical properties and good oil resistance. Polymer blends of NBR rubbers with other polymers have been proposed in the past. Advantages to be gained by such blends would be, for example, the NBR rubber to impart increased stress-strain properties and oil resistance to EPDM polymers and the EPDM polymer to impart better oxidative and thermal resistance to the NBR in the blend. These advantages have been somewhat obtained in polymer blends where the blending polymer is an unsaturated sulfur-vulcanizable polymer such as SBR rubbers, polyisoprenes, polybutadienes, and EPDM terpolymers. However, these advantages have not been obtained in blends of NBR rubbers with polymers which are typically cured using no sulfur or sulfur donors in the curative system. Examples of these polymers are the halogen-containing polymers such as the epihalohydrin rubbers, the fluoroelastomers, polychloroprene rubbers, halogenated polyolefins, and the like. Such rubbers are cured using curative systems designed to effect crosslinking through the halogen sites on the polymer. Polymer blends of normal NBR rubber with such halogen-containing polymers, cured using the cure systems of the halogenated polymer, exhibit poor phisical properties such as low tensile strength, low abrasion resistance, high oil swell, and the like. The use of dual cure systems, i.e., a cure system for the halogen-containing polymer and a cure system for the NBR rubber, has not provided satisfactory results. Often, the curatives employed in a dual cure system are inactive or interact in the presence of each other, resulting in a very poor cure of the polymer blend.

SUMMARY OF THE INVENTION

Polymer blends of a halogen-containing polymer and a diene/nitrile rubber having active halogen cure sites are cured using a common cure system comprising curatives for the halogen-containing polymer. Vulcanizates of the polymer blends exhibit a good balance of tensile strength, low oil swell, flex resistance, and oxidative resistance.

DETAILED DESCRIPTION OF THE INVENTION

The novel vulcanizable compositions of the invention comprise (1) a diene/nitrile rubber having active halogen cure sites, (2) a halogen-containing polymer, and (3) a cure system containing curative ingredients for the halogen-containing polymer. The diene/nitrile rubber having active halogen cure sites is used in from about 1 part to about 99 parts by weight per 100 parts by weight total of the polymer blend. The polymer blend covulcanizes using a common cure system, eliminating the probability of curative ingredients interacting with each other in a deleterious manner. The vulcanizates exhibit a good balance of properties of the polymers used in the blend. For example, the diene/nitrile rubber having active halogen cure sites yields vulcanizates having high tensile strength and low oil swell, but poor oxidative and heat resistance. A halogen-containing acrylate rubber or epihalohydrin elastomer blended with and co-cured with this rubber will impart increased heat and oxidative resistance to the rubber. Other advantages such as increased flex resistance, better processing, and the like, are seen in other covulcanized blends. However, all of the advantages stem from the unique ability to co-cure the polymer blends using a common cure system.

Diene/Nitrile Rubber

The diene/nitrile rubber has active halogen cure sites thereon. The halogen cure sites are obtained by interpolymerizing a halogen-containing monomer with the diene and nitrile monomer, or by post-halogenating a polymer of interpolymerized diene and nitrile monomers.

The diene monomers employed are non-halogen containing conjugated diene monomers containing from 4 to about 10 carbon atoms. Examples of the diene monomers are butadiene, isoprene, 1,3-pentadiene, 2-isopropyl-1,3-butadiene, and the like. The preferred diene monomers are those containing 4 to 6 carbon atoms such as butadiene and isoprene. The interpolymerized diene monomer content of the polymer is from 50 percent to about 98 percent by weight of the total weight of the polymer.

The nitrile monomers employed are non-halogen containing monoolefinically unsaturated nitrile monomers containing 3 to about 6 carbon atoms such as acrylonitrile, methacrylonitrile, crotononitrile, and the like. The preferred nitrile monomers are acrylonitrile and methacrylonitrile. The interpolymerized nitrile monomer content of the polymer is from 1 percent to about 49 percent by weight of the total weight of the polymer. More preferably, the weight content of the nitrile monomer is from about 15 percent to about 49 percent by weight.

Halogen-containing monomers are interpolymerized with the diene monomers and nitrile monomers in levels of from about 0.5 percent to about 20 percent, and more preferably, from about 1 percent to about 5 percent by weight of the total weight of the polymer. The use of over 20 percent by weight of the halogen-containing monomer in the diene/nitrile rubber is not necessary to achieve the advantages of the invention. The halogen-containing monomers are those having a "Q" value of from about 0.1 to about 6. The "e" value can be a positive or negative value, but, more preferably, is a negative value. The "Q" and "e" values of the monomers are readily determined using the Q-e scheme developed by Alfrey and Prince, and Q-e values for monomers are listed in many handbooks. (See R. W. Lenz, *Organic Chemistry of Synthetic High Polymers*, Interscience Publishers, N.Y., N.Y. (1967), pgs. 369–399, for an explanation of the Q-e scheme concept.)

The halogen atom in the monomers can be fluorine, iodine, chlorine, or bromine. However, from a cost and availabiltiy viewpoint, chlorine-containing monomers and bromine-containing monomers are preferred. Examples of halogen-containing monomers within the scope of the invention are halogen-bearing vinylidene hydrocarbons such as vinyl benzyl chloride, vinyl benzyl bromide, 2-$\beta$-chloroisopropyl butadiene, $\alpha$-chloroacrylonitrile, and the like; and halogen-bearing vinylidene hydrocarbons containing oxy linkages such as halogen-containing acrylates such as methyl-$\alpha$-chloroacrylate, 2-chloroethyl acrylate, 3-chloropropyl acrylate, 4-chlorobutyl acrylate, perfluorobutyl acrylate, 2-chloroethyl methacrylate, 2-bromoethyl acrylate, 2-iodoethyl acrylate, 4-chloro2-butenyl acrylate, 2-chloroacetoxyethyl acrylate and methacrylate, and the like; and halogen-containing vinyl ketones such as chloromethyl vinyl ketone, 2-chloroethyl vinyl ketone, and the like. Examples of the more preferred halogen-containing vinylidene monomers are the resonance stabilized halogen-containing monomers having an allylic type halide structure such as vinyl benzyl chloride, and 2-chloroacetoxyethyl acrylate and methacrylate. The most preferred monomers are the chlorine-containing monomers. Excellent results have been obtained using vinyl benzyl chloride as the halogen-containing monomer as it efficiently interpolymerizes with the diene and nitrile monomers and provides a highly reactive allylic type halide cure site on the polymers. The halogen content of the polymer ranges from about 0.2 percent by weight to about 5 percent by weight.

The diene/nitrile rubbers having halogen cure sites thereon can also be obtained by interpolymerizing the diene and nitrile monomer and then post-halogenating the polymer via a chemical reaction. Techniques such as ultra-violet light and peroxide initiation of halogens or halide compounds such as carbon tetrachloride are known to the art. The halogen content of the polymer ranges from about 0.2 percent to about 5 percent by weight. Halogen contents of over 5 percent by weight are not necessary to achieve the improvements provided by the invention.

The interpolymers can be prepared using standard polymerization techniques using known polymerization ingredients. As high conversions of monomer to polymer are desired, the preferred polymerization method is via emulsion polymerization which is typically initiated using peroxides of persulfates with or without a redox system. Various known emulsifiers can be used in standard amounts to create the emulsion. The polymer can be isolated via coagulation using metal salts such as $CaCl_2$ and $MgSO_4$, followed by washing with water, if desired.

The polymers are solid elastomers having a raw polymer mooney viscosity of from about 20 to about 100 or more (ML-4 at 212° F.).

Halogen-Containing Polymer

The halogen-containing polymers are of two main types: those obtained by the polymerization of halogen-bearing monomers and those obtained by halogenating preexisting polymers. Either type of halogen-containing elastomer has a range of from about 0.1% to about 60% by weight of halogen based on the weight of the polymer. Such a range of halogen content can be exemplified by a copolymer of 99.5% by weight of ethyl acrylate and 0.5% by weight of 5-chloroacetoxymethyl-2-norbornene (the low range), and a polyepibromohydrin polymer (the high range). More typically, the halogen-containing elastomeric polymer will have from about 0.2% to about 40% by weight of halogen, exemplified by a copolymer of 99% by weight of ethyl acrylate and 1% by weight of vinyl chloroacetate or 2-chloroethyl acrylate (the low range) and polychloroprene rubber or an epichlorohydrin polymer (the high range). As shown, the halogen content of the polymer can vary over a wide range.

The halogen is chlorine, bromine, fluorine or iodine. More preferably, the halogen is chlorine or bromine, and typically, due to cost and availability, the halogen-containing polymer has chlorine groups. However, the polyfluoronated polymers are also useful.

The halogen-containing polymers can be (co)-polymers of halogen-bearing monomers or they can be halogenated elastomeric polymers (or a polymer containing halogen obtained by both methods).

The larger of the types of halogen-containing polymers are those obtained by polymerization of halogen-bearing monomers. These polymers can contain from about 0.2% by weight to 100% by weight (i.e., homopolymers) of interpolymerized units of a halogen-bearing monomer and up to 99.8% by weight of a copolymerizable, non-halogen-containing vinylidene monomer.

Examples of halogen-bearing monomers are halogen-bearing vinylidene hydrocarbons such as vinyl benzyl chloride, vinyl benzyl bromide, 5-chloromethyl-2-norbornene, 5-bromomethyl-2-norbornene, 5-α-chloroethyl-2-norbornene, and the like; and chlorprene, bromoprene, 2-α-chloroisopropyl butadiene, vinylidene fluoride, perfluoropropylene, fluoroethylene, and the like; and halogen-bearing vinylidene hydrocarbons containing oxy linkages such as halogen-bearing vinyl esters such as vinyl chloroacetate, vinyl bromoacetate, allyl chloroacetate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, perfluorobutyl acrylate, 4-chloro-2-butenyl acrylate, 2-chloroacetoxyethyl acrylate and methacrylate, and the like; halogen-containing vinyl esters such as 2-chloroethyl vinyl ether; halogen-containing vinyl ketones such as chloromethyl vinyl ketone, 2-chloroethyl vinyl ketone, and the like; and 5-chloroacetoxymethyl-2-norbornene, 5-(α, β-dichloropropionylmethyl)-2-norbornene, and the like. Examples of the more preferred halogen-bearing vinylidene monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

These halogen-bearing vinylidene monomers are often copolymerized with one of more non-halogen-containing vinyl monomers containing a terminal vinlidene ($CH_2=C<$) group. These monomers, used in up to 99.8% by weight, are acrylates and methacrylates, such as ethyl acrylate, n-butyl acrylate, octyl acrylate, dodecyl acrylate, methyl methacrylate, phenyl acrylate, cyclohexyl acrylate, and the like; vinyl and allyl esters such as vinyl acetate, vinyl propionate, vinyl butyrate, allyl acetate, and the like; vinyl ketones such as methyl vinyl ketone, propyl vinyl ketone, and the like; vinyl and allyl ethers such as vinyl methylether, vinyl ethylether, vinyl isobutylether, allyl methylether, and the like; vinyl aromatics such as styrene, α-methylstyrene, vinyl toluene, vinyl naphthalene, and the like; α-monoolefins such as ethylene, propylene, 1-butene, 1-hexene, and the like; divinyls such as divinyl benzene, divinyl ether, diethylene glycol diacrylate, and the like; vinyl amides such as acrylamide, methacrylamide, N-methyl methacrylamide, diacetone acrylamide, and the like; hydroxy-containing vinyl monomers such as allyl alcohol, β-hydroxyethyl acrylate, α-hydroxypropyl acrylate, 4-hydroxy-butyl acrylate, β-hydroxyethyl methacrylate; and the like.

One of the most preferred copolymerizable vinylidene monomers to be used with the halogen-bearing monomers is the acrylate monomer. The acrylate monomer has the formula

wherein R is H, —CH₃, or —C₂H₅, and R' is an alkyl radical containing 1 to about 24 carbon atoms, or an alkoxyalkyl or alkylthioalkyl radical containing a total of 2 to about 12 carbon atoms in the radical. The alkyl structure can be linear or branched. Examples of the acrylates are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate n-dodecyl acrylate, n-tetradecyl acrylate, n-octadecyl acrylate, n-eicosyl acrylate, and the like; methyl methacrylate, ethyl methacrylate, n-hesxyl methacrylate, n-octyl methacrylate, n-dodecryl methacrylate, n-octadecyl methacrylate, ethyl ethacrylate, n-butyl ethacrylate, and the like; and methoxyethyl acrylate, ethoxyethyl acrylate, butoxyethyl acrylate, ethoxypropyl acrylate, methoxyethyl methacrylate, methylthioethyl acrylate, hexylthioethyl acrylate, and the like. Often mixtures of two or more types of acrylate monomers are employed.

Examples of the halogen-containing polymers obtained from polymerization of halogen-bearing vinylidene monomers are the halogen-containing acrylate polymers such as poly(ethyl acrylate/2-chloroethyl vinyl ether), poly(ethyl acrylate/vinyl chloroacetate), poly(ethyl acrylate/butyl acrylate/2-chloroethyl acrylate), poly(butyl acrylate/methoxy ethyl acrylate/5-chloromethyl-2-norbornene), poly(ethyl acrylate/vinyl benzyl chloride), poly(ethyl acrylate/2-ethylhexyl acrylate/5-chloroacetoxymethyl-2-norbornene), poly(ethyl acrylate/chloroprene), and other halogen-containing polymers such as polychloroprene, poly(butadiene/chloroprene), polyperfluoropropylene, poly(vinylidene fluoride/perfluoropropylene), and the like.

Another type of halogen-bearing monomer is the epihalohydrin monomer used to prepare epihalohydrin polymers. The polyepihalohydrin polymer can be an epihalohydrin homopolymer, a copolymer of two or more epihalohydrin monomers, or a copolymer of an epihalohydrin monomer(s) with an oxide monomer(s). Copolymers of epihalohydrin monomer and oxide monomer typically comprise about 50% to 100% by weight (i.e., homopolymers) of polymerized units of epihalohydrin monomer(s), and up to 50% by weight of polymerized units of an oxide monomer(s).

The epihalohydrin monomers have the formula

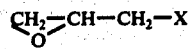

where X is Cl, Br, or I. More preferably, X is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1, 2-epoxy butane, 4-bromo-1,2-epoxy butane, 1-bromoethyl glycidyl ether, and the like.

The oxide comonomers contain a cyclic oxy

ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isoropyl glycidyl ether, n-hexyl glycidyl ether, phenyl glycidyl ether, and the like; glycidyl acrylate and glycidyl methacrylate; allyl glycidyl ether; styrene oxide; and 4- and 5-membered oxy ring compounds such as furan and methyl substituted furan, and the like. Of the oxide comonomers, the alkylene oxides containing 2 to about 8 carbon atoms are preferred. Copolymers of epihalohydrin monomer(s) and alkylene oxide monomer(s) are readily available.

Examples of the more preferred polyepihalohydrin polymers are polyepichlorohydrin, polyepibromohydrin, poly(epichlorohydrin/epibromohydrin), poly(epichlorohydrin/ethylene oxide), poly(epibromohydrin/ethylene oxide), poly(epichlorohydrin/propylene oxide), poly(epichlorohydrin/ethylene oxide/allyl glycidyl ether), and poly(epichlorohydrin/ethylene oxide/propylene oxide).

A second broad type of halogen-containing polymers are those polymers which have been halogenated via a chemical reaction. Although almost any polymer can be halogenated using techniques known to the art (for example, halogenated resins such as brominated phenol-formaldehyde resins can be utilized), the polymers most often halogenated are polymers such as poly-α-olefins like polyethylene, polypropylene, polybutylene, and copolymers thereof. Examples of halogenated elastomertic polymers are chlorinated poly(isobutylene/isoprene) rubber (i.e., chlorobutyl rubber), brominated butyl rubber, and brominated poly(ethylene/propylene/diene) rubber (i.e., brominated EPDM rubber).

The polymer blend of a halogen-containing polymer and a diene/nitrile rubber having active halogen cure sites is cured using a common cure system containing curative ingredients normally used for the cure of the halogen-containing polymer. The use of a common cure system eliminates the possibility that curative ingredients in a dual cure system; i.e., a cure system containing curatives for both of the types of polymer used in the blend, will interact with each other to the detriment of the overall state of cure. Curative ingredients for halogen-containing polymers, especially the commercial polymers, are well known and documented in the art.

Examples of curative ingredients for halogen-containing polymers, which curatives are useful to cure the polymer blends of the invention include polyamines such as ethylenediamine, 1,6-hexanediamine, pentamethylenediamine, N-methylethyl diamine, tetraethyl methylenediamine, triethylenetetraamine, hexamethylene tetraamine, tricretonylidene tetraamine, tetraethylene pentaamine, 4,4'-diaminodiphenylmethane, triethylene diamine, and the like; ammonium carboxylate salts such as ammonium benzoate, ammonium adipate, ammonium stearate, and the like used alone or with alkylhalides such as dodecyl bromide, and other ammonium carboxylate salts disclosed in U.S. Pat. Nos. 3,288,763, 3,458,461, and 3,746,674; amine-aldehyde condensation products such as acetaldehyde-ammonia, butyraldehyde-butylamine, butyraldehyde-aniline, heptaldehyde-aniline, ethylchloride-formaldehyde-ammonia, and the like; imidazolines such as 2-mercaptoimidazoline and others disclosed in U.S. Pat. No. 3,341,491; guanidines such as diphenyl guanidine, di-orthotolyl guanidine, and the like; the metal salts of dialkyl and diaryl dithiocarbamates such as zinc and lead dimethyldithiocarbamate, zinc, cadmium, and tellurium diethyldithiocarbamate, sodium butyldithiocarbamate, zinc dibenzyldithiocarbamate, 2-hydroxypropyl dimethyldithiocarbamate, bis-(dimethylthiocarbamyl) sulfide, N-pentamethyleneammonium-N-pentamethylenedithiocarbamate, and the like, and others disclosed in U.S. Pat. No. 3,876,590; blocked polyamines such as the carbamates like hexamethylenediamine carbamate, ethylenediamine carbamate, N,N'-dicinnamylidene-1,6-hexanediamine; used alone or with acid acceptors such as magnesium oxide or dibasic lead phosphite; and thioureas such as ethylene thiourea, propylene thiourea, N-methylethylene thiourea, dithiouracil, thiobarbituric acid, N-methyl thiourea, N-ethyl thiourea, N-t-butyl thiourea, N,N-dimethyl thiourea, trimethyl thiourea, tetramethyl thiourea, N,N-diethyl thiourea, N,N'-di-n-butyl thiourea, allyl thiourea, N-acetyl thiourea, N,N'-difurfuryl thiourea, N,N'-diphenyl thiourea, N,N'-dicyclohexyl thiourea, and the like, used alone or with an acid acceptor such as zinc oxide or lead tetraoxide, and others disclosed in U.S. Pat. No. 3,317,491. Further cure systems include the more recently developed systems disclosed in U.S. Pat. Nos. 3,875,122; 3,859,241; 3,808,173; 3,755,207; 3,876,590; and 3,732,191 which employ various metal salts and/or oxides in the cure system.

The curative ingredients are employed in the polymer blend at a level of from about 0.1 part to about 7 parts by weight, and more preferably at from about 0.5 part to about 5 parts by weight per 100 parts by weight of th polymer blend. More than one accelerator or type of curative ingredient for halogen-containing polymers can be employed in the polymer blend. The use of specific curative systems in the polymer blends will be further illustrated in the examples.

The polymers and cure system can be mixed using internal mixers such as banbury mixers, extruders, and the like, or mixed on two-roll mills, and the like. Many rubber compounding ingredients such as carbon blacks, fillers, pigments, antioxidants and stabilizers, plasticizers and lubricants, tackifiers, fungicides, and the like, are readily admixed with the polymer blend and cure system combination.

The compositions are cured at temperatures from about 225° F. to about 450° F., whereas a more preferred range is from about 300° F. to about 350+ F. Cure time varies inversely as temperature, and ranges from about 1 minute to about 60 minutes or more.

The polymer blend compositions develop rapid and stable cures. The vulcanizates were evaluated as to their button compression set (ASTM D395V), tensile and elongation (ASTM D412), hardness (ASTM D676 -Durometer A), oil volume swell (ASTM D471), and air test tube aging (ASTM D865). Cure times were determined using a Monsanto rheometer.

The following examples are given to more clearly illustrate the invention. Ingredients are given in the recipes in parts by weight unless otherwise specified.

EXAMPLE I

A diene/nitrile polymer having active halogen cure sites thereon was prepared using an emulsion polymerization process. The polymerization recipe (in parts by weight) and conditions are given below.

| | |
|---|---|
| Butadiene | 66 |
| Acrylonitrile | 32 |
| Vinyl Benzyl Chloride | 2 |
| Alkylbenzene sodium sulfonate | 2 |
| Sodium Salt of Naphthalene Sulfonic Acid | 0.9 |
| Sodium Sulfate | 0.07 |
| Sodium Carbonate | 0.2 |
| Tertiary Dodecyl Mercaptan | 0.4 |
| Sodium Ferric Ethylene Diamine Tetraacetate | 0.035 |
| Sodium Formaldehyde Sulfoxalate | 0.035 |
| Cumene Hydroperoxide | 0.035 |
| Water | 200 |
| Temperature, ° C. | 5 |
| Time, hours | 7.5 |
| Percent Conversion | 76 |

The polymerization was stopped by the addition of 0.5 part by weight of 2,4-di(tert-amyl)hydroquinone. The polymer was isolated by coagulation using a 2% by weight calcuim chloride solution. Analysis of the polymer showed it to contain about 33% by weight of acrylonitrile (using Kjehldahl method for determination of nitrogen), about 2% by weight of vinyl benzyl chloride (using X-ray fluorescense spectroscopy for determination of chlorine content), and about 65% by weight butadiene. The polymer has a raw polymer Mooney viscosity of about 45 (ML-4 at 100° C.)

Using other diene monomers, other nitrile monomers, and/or other halogen-containing monomers in place of the respective monomers used above, other diene/nitrile polymers having chlorine cure sites are readily prepared. Polymerization ingredients and conditions can vary as known to those skilled in the art. For example, using a similar polymerization process, the following polymers were prepared: a polymer of about 42% by weight of acrylonitrile, about 3% by weight of vinyl benzyl chloride, and about 55% by weight of butadiene; a polymer of about 41% by weight of acrylonitrile, about 3% by weight of β-chloroethyl acrylate, about 56% by weight of butadiene; and a polymer of about 36% by weight of acrylonitrile, about 3% by weight of methyl-β-chloroacrylate, and about 61% by weight of butadiene.

EXAMPLE II

A diene/nitrile rubber prepared in the previous example was blended with an acrylate rubber having chlorine cure sites. Blending was conducted by mixing latexes of the two polymers and co-precipitating the latex mix. The polymer blend was then washed with water and dried prior to use. The rubbers used were a diene/nitrile rubber of interpolymerized units of 66% butadiene, 32% acrylonitrile, and 2% vinyl benzyl chloride and a halogen-containing acrylate rubber of 98% ethyl acrylate and 2% vinyl benzyl chloride. The polymer blend was cured using two different cure systems for cure of the halogen-containing acrylate rubber. Curative ingredients for halogen-containing acrylate rubbers such as interpolymers of acrylate monomers with vinyl chloroacetate, chloroethyl vinyl ether, or vinyl benzylchloride include the polyamines, the blocked polyamines (i.e., carbamates), the ammonium salts of carboxylic acids, thioureas, and the metal dialkyl and diaryl dithiocarbamates, all of which have been previously described. The following recipes were used.

| Recipe | A | B |
|---|---|---|
| Polymer Blend | 100 | 100 |
| N770 Black | 65 | 65 |
| Stearic Acid | 1 | 1 |
| α-Methyl Styrenated Diphenylamine | | |
| Pb₃O₄ | 5 | 5 |
| 2-Mercaptoimidazoline | 1.5 | — |
| Hexamethylene Diamine Carbamate | — | 1.0 |

The rubbers were blended at various weight ratios of diene/nitrile rubber to acrylate rubber. Cured vulcani- Two different diene/nitrile rubbers having interpolymerized monomer contents of (A) 66% butadiene, 32% acrylonitrile, and 2% vinyl benzyl chloride and (B) 53% butadiene, 44% acrylonitrile, and 3% vinyl benzyl chloride were admixed using a Banbury mixer with a polyepichlorohydrin homopolymer or a 70% epichlorohydrin/30% ethylene oxide copolymer. The polymer blends were cured using cure systems for cure of the halogen-containing polymer. Recipes and properties of the vulcanizates are given below. A nitrile rubber control sample, i.e., a polymer blend composition containing a diene/nitrile rubber having no halogen cure sites (68% by weight butadiene and 32% by weight acrylonitrile) was also included in the evaluation. The data shows that a higher state of cure was obtained using the polymer blend composition of the invention.

|  | 1 | 2 | 3 | 4 | 5 | 6 | 7 | 8 | 9 | 10 | Control |
|---|---|---|---|---|---|---|---|---|---|---|---|
| Diene/Nitrile Rubber A | 100 | 75 | 50 | 25 | — | — | — | — | — | 50 | — |
| Diene/Nitrile Rubber B | — | — | — | — | — | 100 | 75 | 25 | — | — | — |
| Nitrile Rubber Control | — | — | — | — | — | — | — | — | — | 50 | 50 |
| ECH Homopolymer | — | — | — | — | — | — | — | — | — | 50 | 50 |
| ECH/EO Copolymer | — | 25 | 50 | 75 | 100 | 0 | 25 | 75 | 100 | — | — |
| N770 Black | 65 | 65 | 65 | 65 | 65 | 65 | 65 | 65 | 65 | 65 | 65 |
| Stearic Acid | 1 | 1 | 1 | 1 | 1 | 1 | 1 | 1 | 1 | 1 | 1 |
| Polymerized 1,2-Dihydro-2,2,4-trimethylquinoline | 2 | 2 | 2 | 2 | — | — | — | — | — | 2 | 2 |
| α-Methyl Styrenated Diphenylamine | — | — | — | — | — | 2 | 2 | 2 | 2 | — | — |
| Nickel Dibutyldithiocarbamate | — | — | — | — | — | 1 | 1 | 1 | 1 | 1 | 1 |
| Pb₃O₄ | 5 | 5 | 5 | 5 | 5 | 5 | 5 | 5 | 5 | 5 | 5 |
| 2-Mercaptoimidazoline | 1.5 | 1.5 | 1.5 | 1.5 | 1.5 | 1.5 | 1.5 | 1.5 | 1.5 | 0.75 | 0.75 |
| Cured at 170° C. | | | | | | | | | | | |
| Time, Minutes | 20 | 20 | 20 | 20 | 20 | 15 | 15 | 15 | 15 | 15 | 15 |
| 100% Modulus, psi | 640 | 630 | 600 | 670 | 610 | 720 | 680 | 880 | 810 | 490 | 350 |
| Tensile, psi | 3200 | 2900 | 2650 | 2460 | 1880 | 3560 | 2960 | 2500 | 2020 | 2700 | 2260 |
| Elongation, percent | 350 | 340 | 350 | 320 | 350 | 340 | 340 | 310 | 300 | 400 | 550 |
| Hardness, Duro A | 65 | 64 | 65 | 67 | 66 | 71 | 70 | 71 | 72 | 64 | 63 |
| Percent Compression Set Buttons-70 Hrs. at 150° C. | 69 | 59 | 63 | 64 | 64 | 67 | 72 | 72 | 72 | 91 | 90 |
| Percent Oil Swell ASTM #3 Oil-70 Hrs. at 150° C. | 27 | 23 | 20 | 17 | 13 | 8 | 8 | 9 | 10 | — | — | zate results show good co-vulcanization between the rubbers in the blend.

EXAMPLE IV

|  | Recipe A | | | | | | Recipe B | | | | | |
|---|---|---|---|---|---|---|---|---|---|---|---|---|
|  | 1 | 2 | 3 | 4 | 5 | 6 | 1 | 2 | 3 | 4 | 5 | 6 |
| Parts | | | | | | | | | | | | |
| Diene/Nitrile | 100 | 80 | 60 | 40 | 20 | — | 100 | 80 | 60 | 40 | 20 | — |
| Acrylate | — | 20 | 40 | 60 | 80 | 100 | — | 20 | 40 | 60 | 80 | 100 |
| uz,1/4 Cured at 170° C. Time, Minutes | 20 | 20 | 20 | 20 | 15 | 20 | 25 | 25 | 30 | 25 | 30 | 25 |
| 100% Modulus, psi | 770 | 790 | 790 | 950 | 1160 | 1170 | 1230 | 1140 | 1420 | 1760 | 2010 | — |
| Tensile, psi | 3360 | 3070 | 2970 | 2550 | 2450 | 2020 | 2770 | 3060 | 2770 | 2290 | 2010 | 1610 |
| Elongation, percent | 300 | 300 | 270 | 220 | 190 | 180 | 180 | 200 | 170 | 120 | 100 | 80 |
| Hardness, Duro A | 68 | 67 | 66 | 65 | 67 | 66 | 70 | 68 | 67 | 68 | 70 | 70 |
| Tempered, 24 Hrs. at 150° C. | | | | | | | | | | | | |
| Tensile, psi | 2330 | 2030 | 2230 | 2370 | 2310 | 2420 | 1290 | 1620 | 1610 | 1910 | 1970 | 1940 |
| Elongation, percent | 140 | 120 | 110 | 100 | 100 | 150 | 90 | 90 | 70 | 70 | 60 | 100 |
| Hardness, Duro A | 74 | 73 | 74 | 76 | 77 | 69 | 75 | 75 | 75 | 76 | 79 | 75 |
| Compression Set (Buttons) Percent, 70 Hrs. at 150° C. | | | | | | | | | | | | |
| Cured | 70 | 73 | 77 | 81 | 80 | 77 | 31 | 40 | 43 | 53 | 52 | 54 |
| Tempered | 62 | 66 | 67 | 70 | 67 | 62 | 26 | 35 | 36 | 38 | 40 | 38 |
| Percent Volume Swell ASTM #3 Oil 70 Hrs. at 150° C. | 26 | 22 | 19 | 16 | 13 | 9 | — | — | — | — | — | — |

EXAMPLE III

The diene/nitrile rubbers of the invention are readily blended with and co-vulcanized with halogen-containing polyether polymers such as the epihalohydrin homo- and copolymers. Cure systems for the epihalohydrin polymers include the polyamines, the blocked polyamines (i.e., the carbamates), thioureas, and the imidazolines, all of which have been described.

Polymer blends of a diene/nitrile rubber containing active halogen groups and a halogen-containing diene rubber (Neoprene W and Neoprene GRT sold by DuPont, Inc.) were prepared. Cure systems for such polymer blends are those employed for the polychloroprene rubbers. Examples of these cure systems include thioureas, the metal salts of dialkyl and diaryl dithiocarbamates, and guanidines, used alone or with metal oxides.

The diene/nitrile rubber and polychloroprene polymer blends can also be cured using metal oxides alone.

The diene/nitrile rubber used is diene/nitrile rubber A in the previous example. The rubber was admixed with Neoprene W and Neoprene GRT rubbers using a Banbury mixer. The polymer blends were cured and evaluated for their vulcanizate properties. As a nitrile rubber control, a diene/nitrile rubber having no halogen cure sites (a 68% by weight butadiene/32% by weight acrylonitrile rubber) was also blended with Neoprene W (Series A) and the blend cured using a cure system for the halogen-containing polymer. The polymer blend compositions of the invention exhibit a more efficient, higher state of cure.

EXAMPLE V

Polyfluorocarbons, such as the Viton fluorocarbons sold by DuPont, Inc., can be admixed with the diene/nitrile rubbers of the invention and the polymer blend cure using curative ingredients for the halogen-containing fluorocarbon polymer. Cure systems for such polymers include the blocked polyamines (i.e., carbamates), which are normally used with an acid acceptor such as lead oxide or magnesium oxide.

A 66% by weight butadiene/32% by weight acrylonitrile/2% by weight vinyl benzyl chloride rubber was mixed using a Banbury mixer with a vinylidene fluoride/hexafluoropropylene copolymer (Viton A sold by DuPont, Inc.) and the polymer blend cured and tested.

Series A
Polymer Blends With Neoprene W

| | 1 | 2 | 3 | 4 | 5 | 6 | 7 | 8 | 9 | 10 | 11 | 12 | 13 | Control |
|---|---|---|---|---|---|---|---|---|---|---|---|---|---|---|
| Diene/Nitrile rubber | — | 33 | 67 | 100 | 100 | 75 | 50 | 25 | — | 25 | 75 | 100 | 50 | — |
| Nitrile Rubber Control | — | — | — | — | — | — | — | — | — | — | — | — | — | 50 |
| Neoprene N | 100 | 67 | 33 | — | — | 25 | 50 | 75 | 100 | 75 | 25 | — | 50 | 50 |
| N770 Black | 52 | 56 | 61 | 65 | 65 | 62 | 59 | 55 | 52 | 55 | 62 | 65 | 65 | 65 |
| Stearic Acid | 1 | 1 | 1 | 1 | 1 | 1 | 1 | 1 | 1 | 1 | 1 | 1 | 1 | 1 |
| α-Methyl Styrenated Diphenylamine | 4 | 4 | 4 | 4 | — | — | — | — | — | — | — | — | — | — |
| Polymerized 1,2-dihydro-2,2,4-trimethylguinoline | — | — | — | — | 2 | 2 | 2 | 2 | 2 | 2 | 2 | 2 | 2 | 2 |
| Mgo | 4 | 4 | 4 | 4 | 4 | 4 | 4 | 4 | 4 | 3 | 1 | — | 4 | 4 |
| Zno | 5 | 5 | 5 | 5 | 5 | 5 | 5 | 5 | 5 | 5 | 5 | 5 | 5 | 5 |
| 2-Mercaptoimidazoline | 0.67 | 0.67 | 0.67 | 0.67 | 1.6 | 1.4 | 1.2 | 1.0 | 0.8 | 1.0 | 1.4 | 1.6 | 0.75 | 0.75 |
| Cured at 170° C. Time, Minutes | 15 | 15 | 15 | 15 | 10 | 10 | 10 | 10 | 10 | 10 | 10 | 10 | 15 | 15 |
| 100% modulus, psi | 690 | 650 | 560 | 390 | 690 | 810 | 1010 | 950 | 900 | 860 | 630 | 540 | 1150 | 560 |
| Tensile, psi | 3120 | 3030 | 2990 | 2760 | 2850 | 2970 | 2910 | 3000 | 3290 | 3020 | 3030 | 2960 | 3370 | 1580 |
| Elongation, percent | 250 | 300 | 300 | 380 | 320 | 280 | 250 | 250 | 260 | 330 | 390 | 220 | 270 | |
| Hardness, Duro A | 68 | 69 | 69 | 67 | 66 | 69 | 70 | 71 | 70 | 70 | 66 | 65 | 72 | 67 |
| Buttons -70 hrs. at 150° C. | 29 | 38 | 38 | 47 | 61 | 51 | 39 | 36 | 30 | 36 | 50 | 60 | 45 | 60 |
| Percent Volume Swell ASTM #3 Oil - 70 Hrs. at 150° C. | 79 | 53 | 33 | 18 | 26 | 36 | 46 | 59 | 74 | 59 | 37 | 27 | — | — |

Series B
Polymer Blends With Neoprene GRT

| | 1 | 2 | 3 | 4 | 5 | 6 | 7 |
|---|---|---|---|---|---|---|---|
| Diene/Nitrile Rubber | — | 33 | 67 | 100 | 67 | 33 | — |
| Neoprene GRT | 100 | 67 | 33 | — | 33 | 67 | 100 |
| N770 Black | 55 | 58 | 62 | 65 | 62 | 58 | 55 |
| Stearic Acid | 1 | 1 | 1 | 1 | 1 | 1 | 1 |
| Polymerized 1,2-dihydro-2,2,4-trimethylguinoline | 2 | 2 | 2 | 2 | 2 | 2 | 2 |
| MgO | 4 | 2.7 | 1.3 | — | — | — | — |
| ZnO | 5 | 5 | 5 | 5 | 5 | 5 | 5 |
| Cured at 170° C. Time, Minutes | 10 | 15 | 20 | 25 | 15 | 10 | 5 |
| 100% Modulus, psi | 710 | 830 | 510 | 640 | 600 | 720 | 570 |
| Tensile, psi | 2970 | 3160 | 2890 | 3300 | 3290 | 3280 | 3070 |
| Elongation, percent | 320 | 300 | 350 | 300 | 330 | 330 | 430 |
| Hardness, Duro A | 71 | 71 | 67 | 69 | 68 | 70 | 68 |
| Compression set, percent Buttons-70 Hrs. at 150° C. | 88 | 74 | 66 | 57 | 76 | 90 | 100 |
| Percent Volume Swell ASTM #3 Oil - 70 Hrs. at 150° C. | 99 | 65 | 38 | 20 | 36 | 61 | 115 |

Good co-vulcanization of the two rubbers in the blend was achieved.

|  | 1 | 2 | 3 | 4 | 5 |
|---|---|---|---|---|---|
| Diene/Nitrile Rubber | — | 25 | 50 | 75 | 100 |
| Viton A | 100 | 75 | 50 | 25 | — |
| N991 Black | 25 | 25 | 25 | 25 | 25 |
| α-Methyl Styrenated Diphenylamine | — | 1 | 2 | 3 | 4 |
| MgO | 15 | 15 | 15 | 15 | 15 |
| Hexamethylenediamine Carbamate | 1.25 | 1.25 | 1.25 | 1.25 | 1.25 |
| Cured 20 Minutes at 170° C. | | | | | |
| 100% Modulus, psi | 440 | 290 | 170 | 120 | 100 |
| Tensile, psi | 1590 | 1690 | 1710 | 1550 | 1270 |
| Elongation, percent | 290 | 550 | 630 | 610 | 530 |
| Hardness, Duro A | 67 | 62 | 56 | 54 | 52 |
| Compression Set, Percent | 72 | 68 | 64 | 59 | 45 |
| Buttons - 70 Hrs. at 150° C. | | | | | |
| Percent Volume Swell | | | | | |
| ASTM #3 Oil - 70 Hrs. at 150° C. | 1 | 7 | 13 | 18 | 22 |

EXAMPLE VI

Polymer blends of halogenated butyl rubber and a diene/nitrile rubber of the invention were prepared. Cure systems for such blends would be the curative ingredients for the halogen-containing butyl polymer. Such curatives include thioureas and imidazolines which are normally used with acid acceptors such as magnesium oxide or zinc oxide. The diene/nitrile rubber used in the blends was the same as that used in Example II. The halogenated butyl rubbers are identified as a chlorinated butyl rubber having a chlorine content of about 1.2% by weight and a brominated butyl rubber having a bromine content of about 2% by weight. The polymer blends were cured and the following results obtained.

|  | 1 | 2 | 3 | 4 | 5 | 6 | 7 | 8 |
|---|---|---|---|---|---|---|---|---|
| Diene/Nitrile Rubber | 100 | 67 | 33 | — | 100 | 67 | 33 | — |
| Chlorobutyl Rubber | — | 33 | 67 | 100 | — | — | — | — |
| Bromobutyl Rubber | — | — | — | — | — | 33 | 67 | 100 |
| N770 Black | 65 | 65 | 65 | 65 | 65 | 65 | 65 | 65 |
| Stearic Acid | 1 | 1 | 1 | 1 | 1 | 1 | 1 | 1 |
| α-Methyl Styrenated Diphenylamine | 4 | 4 | 4 | 4 | 4 | 4 | 4 | 4 |
| ZnO | 5 | 5 | 5 | 5 | 5 | 5 | 5 | 5 |
| MgO | 1 | 1 | 1 | 1 | 1 | 1 | 1 | 1 |
| 2-Mercaptoimidazoline | 1.5 | 1.5 | 1.5 | 1.5 | 1.5 | 1.5 | 1.5 | 1.5 |
| Cured at 170° C. | | | | | | | | |
| Time, Minutes | 20 | 20 | 20 | 20 | 14 | 12 | 10 | 8 |
| 100% Modulus, psi | 510 | 510 | 520 | 480 | 370 | 480 | 560 | 390 |
| Tensile, psi | 2970 | 2240 | 1760 | 1760 | 2850 | 2370 | 1820 | 1890 |
| Elongation, percent | 370 | 350 | 360 | 230 | 400 | 310 | 250 | 210 |
| Hardness, Duro A | 64 | 64 | 64 | 60 | 67 | 67 | 65 | 59 |
| Compression Set, Percent | 60 | 71 | 76 | 24 | 73 | 55 | 45 | 49 |
| Buttons - 70 Hrs. at 150° C. | | | | | | | | |
| Percent Volume Swell | 24 | 65 | 120 | 144 | 19 | 58 | 113 | 163 |
| ASTM #3 Oil - 70 Hrs. at 150° C. | | | | | | | | |

I claim:

1. A vulcanizable composition comprising (A) a polymer blend of (1) from about 1 part to about 99 parts by weight of a diene/nitrile rubber having a halogen content of from about 0.2 percent to about 5 percent by weight based on the polymer and comprised of interpolymerized units of from 50 percent to about 98 percent by weight of a non-halogen containing conjugated diene monomer having from 4 to about 10 carbon atoms, from about 1 percent to about 49 percent by weight of a non-halogen containing monoolefinically unsaturated nitrile monomer having 3 to about 6 carbon atoms, and from about 0.5 percent to about 20 percent by weight of a halogen-containing monomer have a Q value of from about 0.1 to about 6 and selected from the group consisting of halogen-bearing vinylidene hydrocarbons, halogen-containing acrylates, and halogen-containing vinyl ketones, and (2) from about 1 part to about 99 parts by weight of a halogen-containing polymer selected from the group consisting of halogen-containing acrylate rubbers, halogen-containing diene rubbers, epihalohydrin polymers, and polyfluorocarbons, and (B) a cure system for the polymer blend consisting essentially of from about 0.1 part to about 7 parts by weight of curative ingredients for the halogen-containing polymer of (A) (2) above, all parts by weight based upon 100 parts by weight of the polymer blend.

2. A composition of claim 1 wherein the diene/nitrile rubber is comprised of interpolymerized units of from 50 percent to about 98 percent by weight of a non-halogen containing conjugated diene monomer containing 4 to 6 carbon atoms, from about 15 percent to about 49 percent by weight of acrylonitrile or methacrylonitrile, and from about 1 percent to about 5 percent by weight of a halogen-containing monomer selected from the group consisting of halogen-bearing vinylidene hydrocarbons, halogen-containing acrylates, and halogen-containing vinyl ketones.

3. A composition of claim 2 wherein the halogen-containing polymer is selected from the group consisting of poly(ethyl acrylate/vinyl benzyl chloride), polyepichlorohydrin, poly(epichlorohydrin/ethylene oxide), polychloroprene, poly(vinylidene fluoride/hexafluoropropylene), chlorinated butyl rubber, and brominated butyl rubber.

4. A composition of claim 3 wherein the diene/nitrile rubber, the diene monomer is butadiene or isoprene, the vinyl nitrile monomer is acrylonitrile, and the halogen-containing monomer is a halogen-bearing vinylidene hydrocarbon selected from the group consisting of vinyl benzyl chloride, vinyl benzyl bromide, and 2-β-chloroisopropyl butadiene.

5. A composition of claim 4 wherein the diene/nitrile rubber consists of interpolymerized units of butadiene, acrylonitrile, and vinyl benzyl chloride monomers.

6. A composition of claim 5 wherein the halogen-containing polymer is poly(ethyl acrylate/vinyl benzyl chloride) and the curative ingredients are lead tetraoxide and 2-mercaptoimidazoline or hexamethylenediamine carbamate.

7. A composition of claim 5 wherein the halogen-containing polymer is polyepichlorohydrin or poly(epichlorohydrin/ethylene oxide) and the curative ingredients are lead tetraoxide and 2-mercaptoimidazoline.

8. A composition of claim 5 wherein the halogen-containing polymer is polychloroprene and the curative ingredient is magnesium oxide, zinc oxide, 2-mercaptoimidaline, or mixtures thereof.

9. A composition of claim 5 wherein the halogen-containing polymer is poly(vinylidene fluoride/hexafluoropropylene) and the curative ingredients are magnesium oxide and hexa-methylenediamine carbamate.

10. A composition of claim 5 wherein the halogen-containing polymer is chlorinated butyl rubber or brominated butyl rubber and the curative ingredients are zinc oxide, magnesium oxide, and 2-mercaptoimidazoline.

11. A composition of claim 1 wherein the halogen-containing diene rubber is selected from the group consisting of polychloroprene, poly(butadiene/chloroprene), chlorobutyl rubber, bromobutyl rubber, and brominated poly(ethylene/propylene/diene) rubber.

* * * * *